(12) United States Patent
Guanzon et al.

(10) Patent No.: US 6,742,823 B2
(45) Date of Patent: Jun. 1, 2004

(54) REAR CARGO LID ASSEMBLY

(75) Inventors: Ruben Guanzon, Powell, OH (US); Toshikazu Hirose, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 144 days.

(21) Appl. No.: 10/035,945

(22) Filed: Dec. 26, 2001

(65) Prior Publication Data

US 2003/0116989 A1 Jun. 26, 2003

(51) Int. Cl.$^7$ ................................................ B60N 3/12
(52) U.S. Cl. .......................... 296/37.16; 296/37.14; 16/266; 280/845
(58) Field of Search .......................... 296/37.16, 37.14, 296/37.1, 37.8, 24.1; 16/266, 260, 262; 220/845, 847

(56) References Cited

U.S. PATENT DOCUMENTS

| | | | | | |
|---|---|---|---|---|---|
| 2,732,581 | A | * | 1/1956 | Heck ............................ | 16/224 |
| 3,333,726 | A | * | 8/1967 | Belanger ...................... | 16/266 |
| 3,471,874 | A | * | 10/1969 | Dixon .......................... | 16/266 |
| 4,282,983 | A | * | 8/1981 | Swartzbaugh ................ | 16/227 |
| 4,515,424 | A | * | 5/1985 | Sakurai ........................ | 16/266 |
| 4,549,670 | A | * | 10/1985 | Trendler ...................... | 16/257 |
| 4,598,889 | A | * | 7/1986 | Remington ................... | 16/260 |
| 4,701,977 | A | * | 10/1987 | Hori et al. .................... | 16/266 |
| 4,850,081 | A | * | 7/1989 | Grant ........................... | 16/266 |
| 5,265,310 | A | * | 11/1993 | Ichinokawa .................. | 16/266 |
| 5,361,456 | A | * | 11/1994 | Newby, Sr. ................... | 16/260 |
| 5,979,016 | A | * | 11/1999 | Fan .............................. | 16/266 |
| 6,003,204 | A | * | 12/1999 | Roach et al. ................. | 16/266 |
| 6,019,238 | A | * | 2/2000 | Kindig et al. ................. | 16/266 |
| 6,027,155 | A | * | 2/2000 | Wisniewski et al. ......... | 296/37.1 |
| 6,065,251 | A | * | 5/2000 | Kindrick ...................... | 16/266 |
| 6,257,656 | B1 | * | 7/2001 | Cook et al. ................... | 16/266 |
| 6,338,181 | B1 | * | 1/2002 | Hwang ......................... | 16/266 |
| 6,363,576 | B1 | * | 4/2002 | Hsu et al. ..................... | 16/266 |
| 2002/0070574 | A1 | * | 6/2002 | Carlsson et al. ............. | 296/37.14 |

FOREIGN PATENT DOCUMENTS

| | | | | |
|---|---|---|---|---|
| DE | 3414401 | * | 10/1985 | .................. 16/260 |
| FR | 2558512 | * | 7/1985 | .................. 16/260 |

\* cited by examiner

Primary Examiner—Joseph D. Pape
Assistant Examiner—H. Gutman
(74) Attorney, Agent, or Firm—Rankin, Hill, Porter & Clark LLP

(57) ABSTRACT

A cargo bin lid hinge includes a body member, a first hinge arm, and a second hinge arm. The first hinge arm extends from the body member and is generally aligned with the body member. The second hinge arm extends from the body member, and is curved and extends away from a plane of the body member. The first and second hinge arms cooperate to define an elongated hinge pin-receiving receptacle. A hinge pin has a flat surface that facilitates snap-fitting assembly of the hinge thereon.

9 Claims, 5 Drawing Sheets

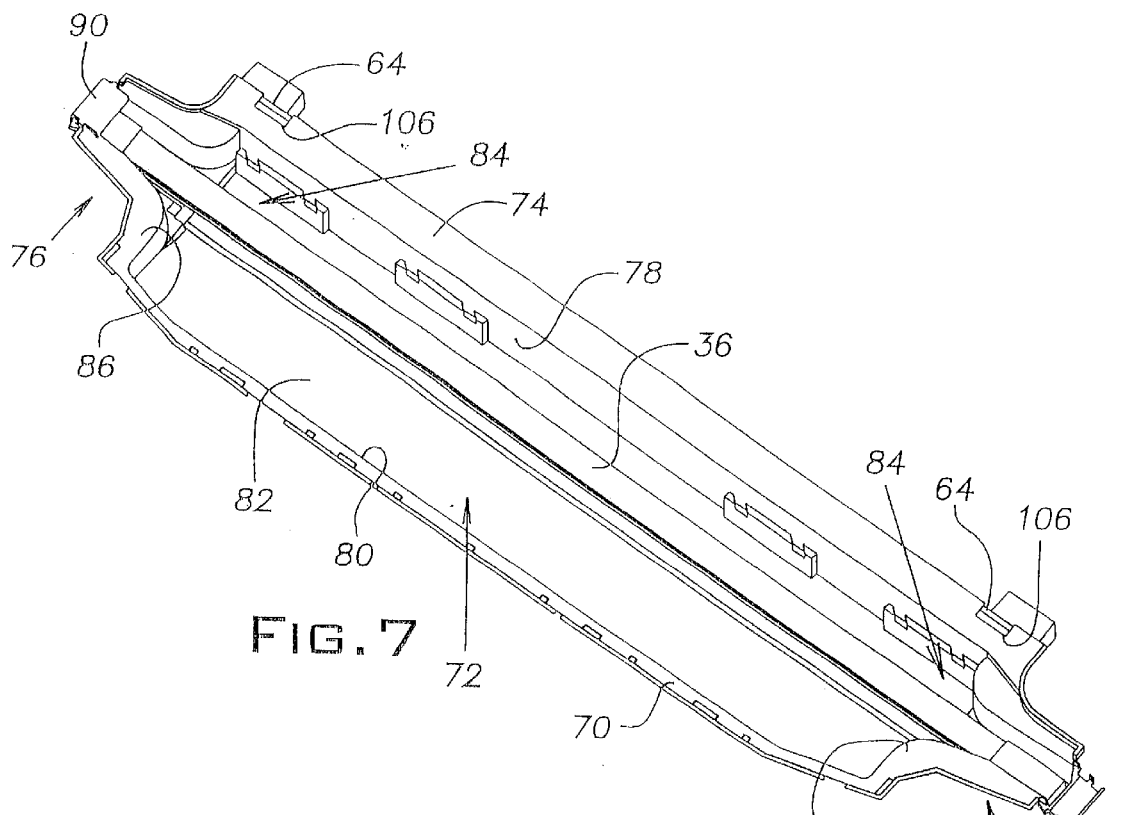
FIG. 7
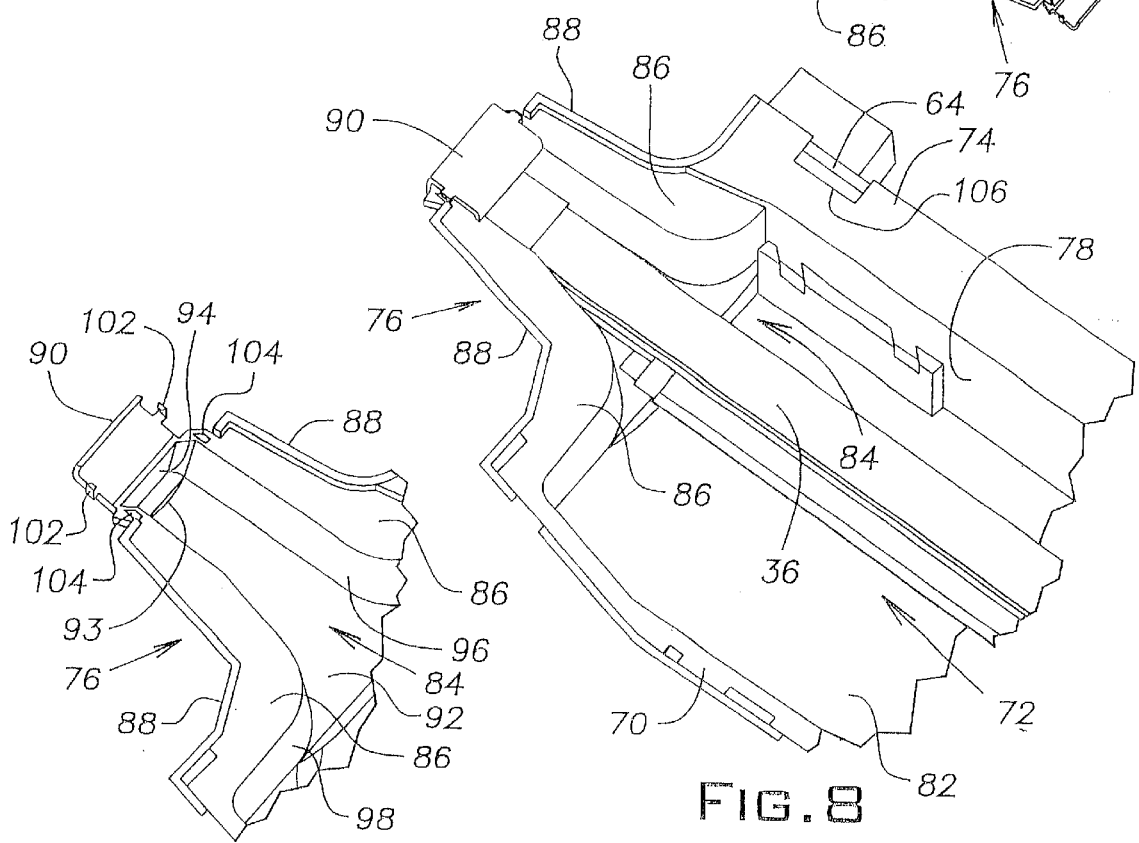
FIG. 9
FIG. 8

REAR CARGO LID ASSEMBLY

BACKGROUND OF THE INVENTION

Cargo storage areas are well known in the art and have developed over the years in an attempt to satisfy two competing requirements. The first requirement is to maximize the storage space within the vehicle while the second requirement is to provide the interior of the automobile with an attractive appearance.

In response to these competing requirements, cargo bin lids that are movable between a closed position, wherein the cargo bin is covered, and an open position, wherein the cargo bin is accessible, have been developed.

Unfortunately, in the past such lids have proven to be difficult to assemble within the limited space available in the vehicle. Therefore, there exists a need in the art for an improved cargo bin lid that is easy to manufacture and assemble. There also exists a need in the art for an improved hinge for a cargo bid lid that facilitates assembly of the cargo bin lid to a cargo bin liner.

SUMMARY OF THE INVENTION

The present invention is directed toward a cargo bin lid that is easy to manufacture and assemble. The present invention is more specifically directed toward an improved hinge for a cargo bid lid that facilitates assembly of the cargo bin lid to a cargo bin liner.

In accordance with the present invention, a cargo bin lid hinge includes a body member and first and second hinge arms extending from the body member. The body member is secured to a cargo bin lid. The first hinge arm extends from the body member and is generally aligned with the body member. The second hinge arm also extends from the body member but is curved and extends away from a plane of the body member. The first and second hinge arms cooperate to define an elongated hinge pin receiving receptacle.

In further accordance with the present invention, a cargo bin assembly includes a cargo bin liner and a cargo bin lid. The cargo bin liner includes a raised platform that defines a pair of spaced apart openings. A hinge pin traverses each of the openings and includes a flat surface that is at an angle to the raised platform. The cargo bin lid includes an upper surface and a lower surface, the lower surface having a pair of spaced apart hinge receiving recesses formed therein.

In accordance with an inventive method for assembly of a cargo bin lid to a cargo bin liner, the cargo bin lid is positioned such that the hinges are adjacent the hinge pins and the cargo bin lid is at an angle to the raised panel, the angle being essentially equal to the angle that the hinge pin flat surface makes with the raised platform. The hinge is moved against the hinge pin such that the first hinge arms are against the leading edge and the second hinge arms are on a radially opposite side of the hinge pins. The cargo bin lid is pushed toward the hinge pins and thereby spreads the first and second hinge arms away from each other to insert the hinge pin therebetween.

BRIEF DESCRIPTION OF THE DRAWINGS

These and further features of the invention will be apparent with reference to the following description and drawings, wherein:

FIG. 7 is a perspective view of the cargo bin liner with a tonneau cover received therein;

FIG. 8 is an enlarged perspective view of an outwardly extending wing of the cargo liner with the tonneau cover received therein; and, FIG. 9 is an enlarged perspective view of the outwardly extending wing of the cargo bin liner, with the tonneau cover removed.

DETAILED DESCRIPTION OF THE PREFERRED EMBODIMENTS

Figure 1:
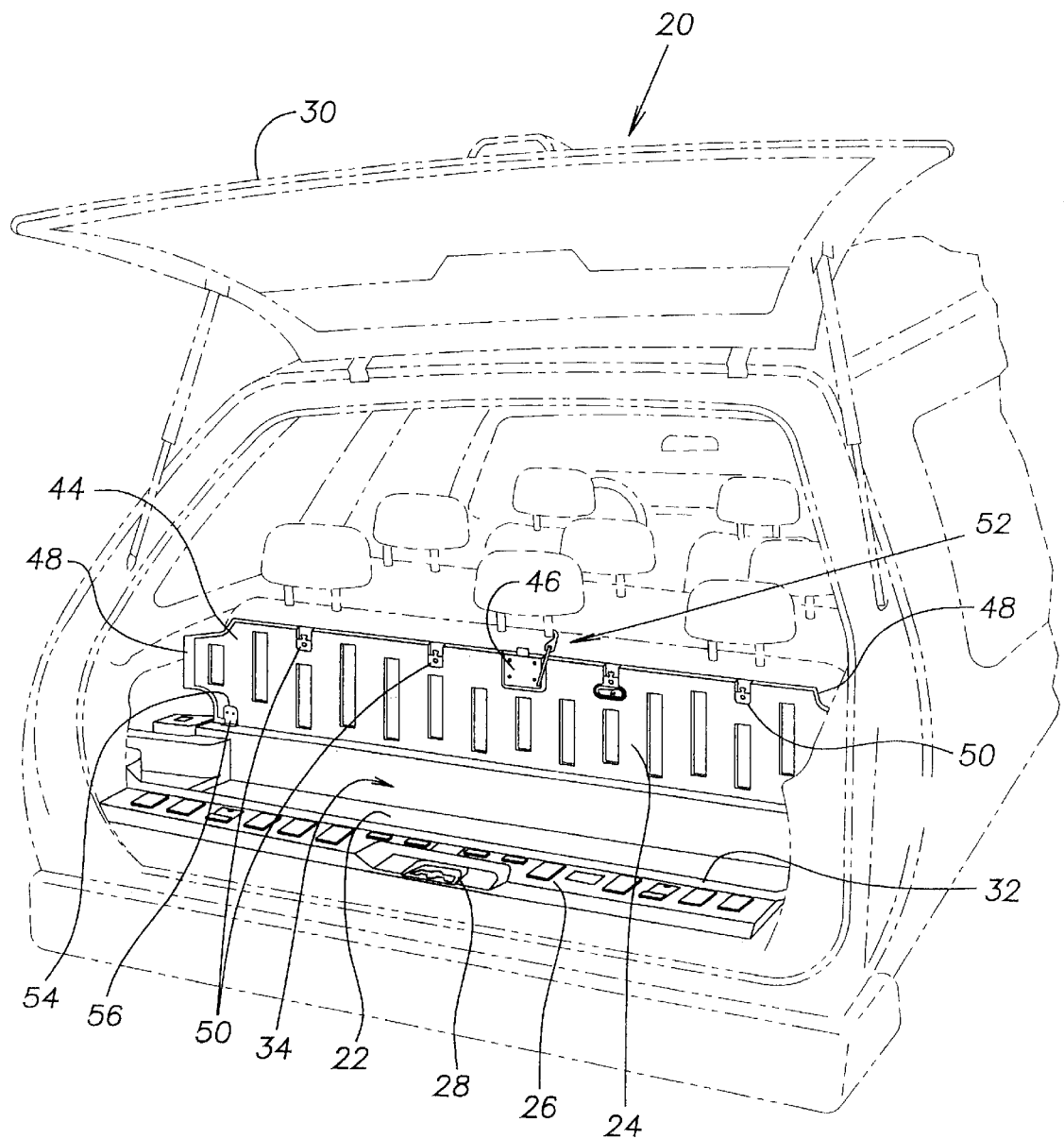
FIG. 1 schematically illustrates a vehicle incorporating the present invention.

With reference to FIG. 1, a rear end of a vehicle 20 incorporating a cargo bin liner 22 and cargo bin lid 24 according to the present invention is schematically illustrated. The vehicle 20 includes a generally horizontal panel 26 that incorporates a latch assembly 28 for the rear hatch 30. The panel 26 includes a forward-facing portion 32 that is recessed relative to the remainder of the panel 26. The cargo bin liner 22 is disposed relatively in front of the panel 26, and defines a receptacle 34 for a tonneau cover 36 (FIG. 7), to be described hereinafter.

Figure 2:
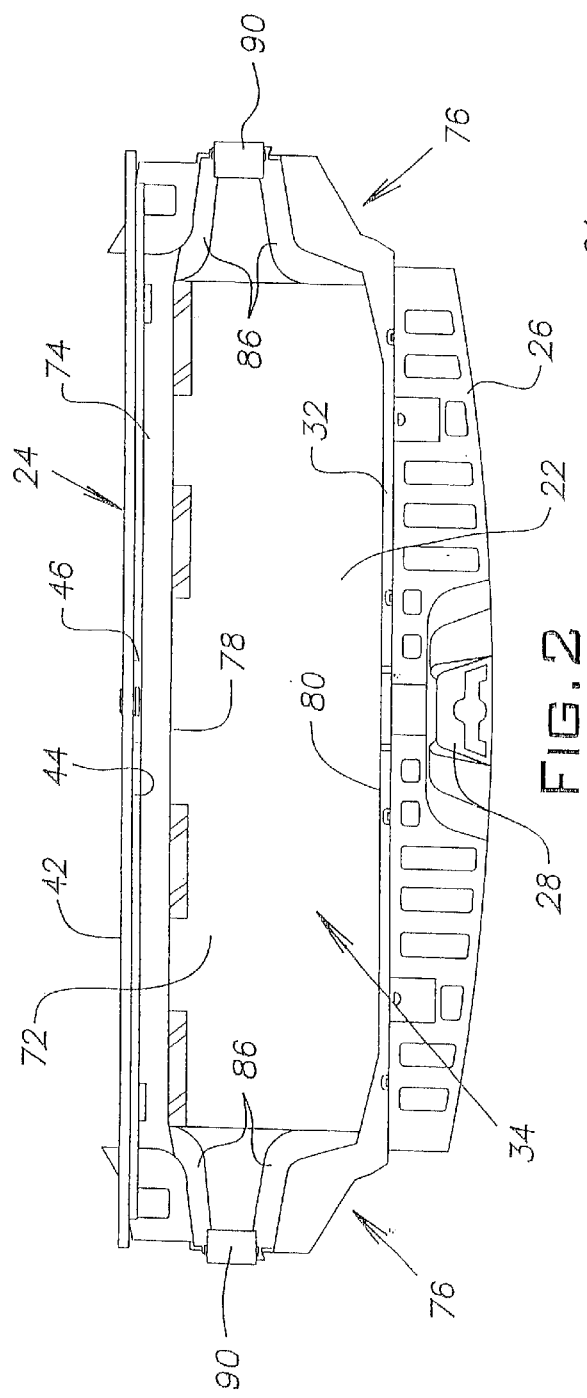
FIG. 2 is a top plan view showing a cargo bin liner, cargo bin lid, and panel, with the cargo bin lid in the open position.
Figure 3:
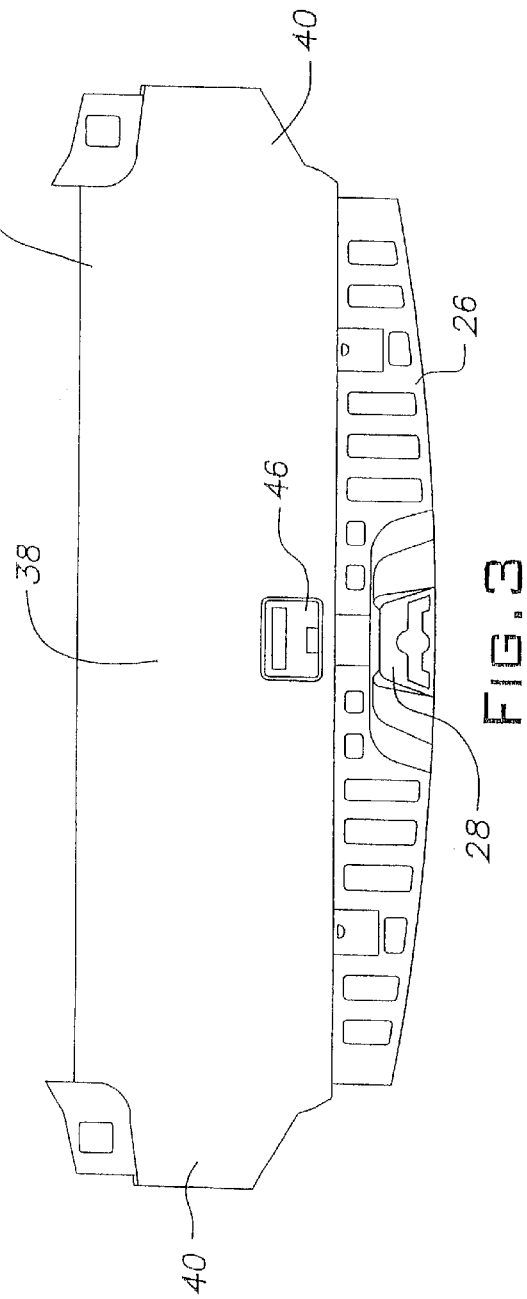
FIG. 3 is a top plan view similar to FIG. 2, but showing the cargo bin lid in the closed position.

The cargo bin lid 24, which is movable between a closed position covering the receptacle 34 provided by the cargo bin liner 22 and an open position permitting access to cargo bin liner 22, is shown in the open position in FIGS. 1–2 and in the closed position in FIG. 3. The cargo bin lid 24, which has a central body member 38 from which laterally project a pair of extensions 40, has an upper surface 42 and a lower surface 44. The upper surface 42 is generally planar and has a sliding latch assembly 46 disposed toward an upper edge (rearward) thereof by means of which the lid 24 may be releasably secured to a catch (not shown) provided on the panel 26 when the lid 24 is in the closed position. The lower surface 44 of the cargo bin lid 24 has a pattern of relatively recessed portions therein to stiffen the lid 24 against deformation.

The cargo bin lid lower surface 44 also provides a peripheral recessed portion 48, which is provided to assist in positioning the cargo bin lid 24 on the cargo bin liner 22 and panel 26, as will be discussed more fully hereinafter. Several hooks 50 are provided along the upper (rearward) edge of the cargo bin lid lower surface 44 on which items, such as grocery bags, backpacks, etc., may be hung. The upper (rearward) edge also includes a tether assembly 52 that is operable to secure the cargo bin lid 24 in the open position during operating of the vehicle 20. A pair of hinge-receiving recesses 54 are provided adjacent a lower (forward) edge and lateral sides of the cargo bin lid lower surface 44. The hinge-receiving recesses 54 are essentially extensions of the peripheral recess 48.

Figure 4:
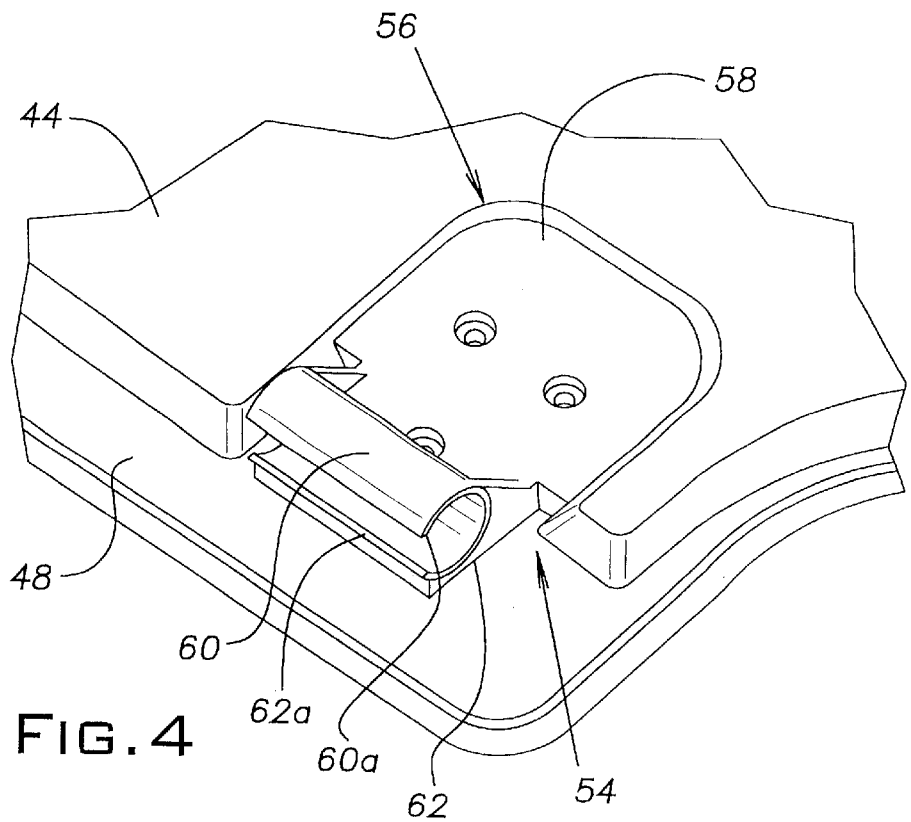
FIG. 4 is an enlarged perspective view of a portion of a hinge disposed on the cargo bin lid.
Figure 5:
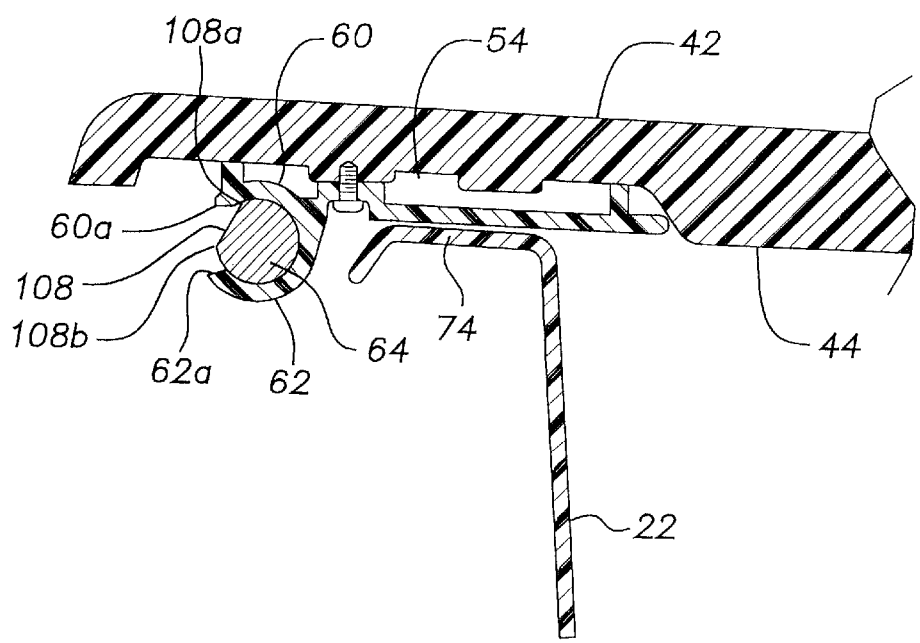
FIG. 5 is a cross sectional view of the cargo bin lid and cargo bin liner showing the hinge of the lid secured to a hinge pin of the liner.
Figure 6:
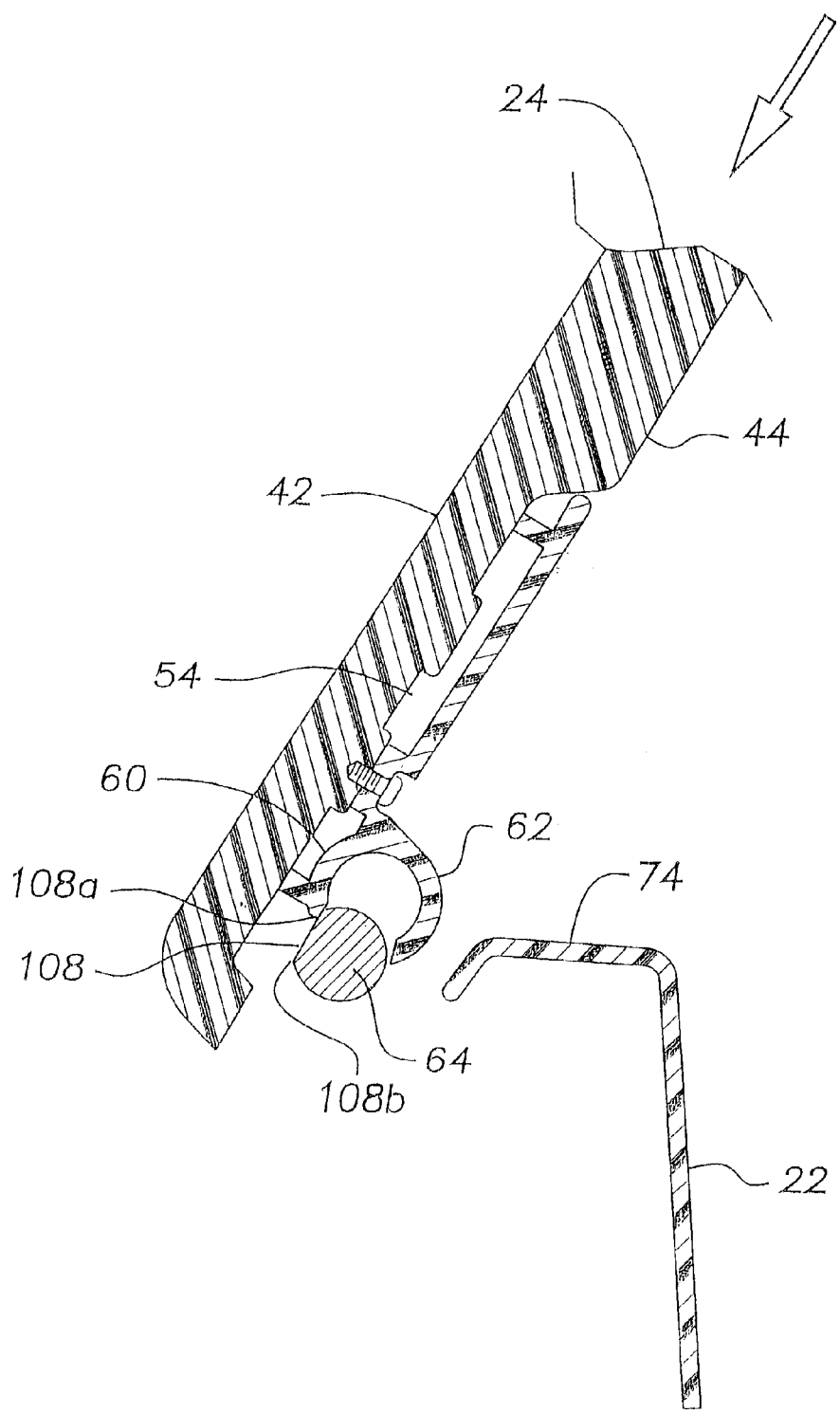
FIG. 6 is similar to FIG. 5, but shows the lid in an angled orientation prior to snap-fitting assembly of the hinge over the hinge pin.

With reference to FIGS. 4–6, a hinge 56 is received within an associated hinge-receiving recess 54 in the cargo bin lid lower surface 44. Each of the hinges 56 has a body member 58 disposed in the hinge-receiving recess 54 and from which first and second hinge arms 60, 62 extend. When installed in the hinge-receiving recess, the outer surface of the body member 58 is substantially flush with a surrounding surface of the cargo bin lower surface 44, as illustrated.

The first hinge arm 60 is essentially an extension of the body member 58 and is disposed against the cargo bin lid lower surface 44. The second hinge arm 62, which traverses a curve or arc, extends away from the body member 58 and relatively beyond (below) the cargo bin lid lower surface 44, as illustrated. The first and second hinge arms 60, 62 cooperate to define an elongated receptacle, which is somewhat C-shaped in cross section, that snap-fittingly receives a hinge pin or striker 64 provided by the cargo bin liner 22 and described further hereinafter. The arc defined by the combination of the first and second hinge arms 60, 62 may be increased or decreased from that shown in the drawings so as to provide a desired retention force. The distal end of the first hinge arm 60 preferably includes a rib or enlargement 60a that faces the second hinge arm 62 while the distal end of the second hinge arm 62 includes a rib or enlargement 62a that faces the first hinge arm 60. The hinge arm ribs 60a, 62a help to stiffen the distal end of the hinge arms 60, 62 and thereby more securely retain the hinge pin 64 therebetween.

The cargo bin liner 22 is preferably formed from plastic and is integrally molded to form a unitary or one-piece structure. With reference to FIGS. 2, 3, and 7–9, the cargo bin liner 22 is shown to include a rearward-facing flange 70, a central well portion 72, a raised platform 74, and a pair of outwardly extending wings 76. As will be appreciated from the drawings, when the lid 24 is closed, the central body portion 38 of the lid 24 overlies the central well portion 72 of the cargo bin liner 22 and the pair of extensions 40 overlies the outwardly extending wings 76.

The rearward-facing flange 70 is retained relatively beneath the forward-facing recessed portion 32 of the panel 26 by means of conventional fastening techniques. The central well portion 72 is a generally cup-shaped member that defines a central storage area of the cargo bin liner 22. The central well portion 72 includes a forward vertical wall 78, a horizontal base wall 82, and a rearward vertical wall 80. The rearward vertical wall 80 extends downwardly from the rearward-facing flange 70 and the forward vertical wall 78 is integrally connected to the raised platform 74, as illustrated. The base wall 82 interconnects the forward and rearward vertical walls 78, 80.

Each of the outwardly extending wings 76, which are adapted to receive an end of the tonneau cover 36 and to vertically support the closed cargo bin lid 24, includes a bowl-shaped wall 84, a pair of spaced apart engagement surfaces 86, a peripheral rim 88, and a cap member 90. The bowl-shaped wall 84 is stepped relatively above the base wall 82 of the central well portion 72, and includes a bottom wall 92, an end wall 94, a forward wall 96, and a rearward wall 98. The bottom wall 92 includes a raised ledge or support surface 93 adjacent the end wall 94 upon which an end of the tonneau cover 36 is placed and vertically supported. The forward and rearward walls 96, 98, which are vertically oriented and interconnect the bottom wall 92 with the engagement surfaces 86, are spaced from one another a distance that closely matches a width dimension of the tonneau cover 36 so as to snugly receive the tonneau cover 36 therebetween. The cap members 90 laterally extend from an upper end of the end walls 94, and include a pair of mounting tabs 102. The mounting tabs 102 are adapted to fit within accommodating openings 104 that are formed in the upper end of the end walls 94. When the mounting tabs 102 are snapped through the openings 104, the cap members 90 overlie the end wall 94 and cooperate with outer ends of the forward and rearward walls 96, 98 to define a pocket that is adapted to receive the end of the tonneau cover 36.

The end wall 94 serves as a mounting surface against which the end of the tonneau cover is frictionally secured to positively secure the tonneau cover 36 against movement during operation of the vehicle 20. In this regard it is important to realize that tonneau covers 36 are conventionally axially spring-loaded to facilitate secure mounting during use in the passenger compartment. Therefore, for storage in the cargo bin liner 22 of the present invention, the tonneau cover 36 is collapsed in a lengthwise direction, inserted into the desired storage position, and then allowed to expand into an interference fit with the end walls 94 of the cargo bin outwardly extending wings 76.

The raised platform 74 is generally planar and includes a pair of openings 106 that are each traversed by the associated hinge pin 64. Each of the hinge pins has a flat surface 108 formed therein so as to be generally D-shaped in cross section. As shown best in FIGS. 5–6, the flat surface 108 is generally at an angle to the plane of the raised platform 74, the angle being between about 30–60°, and preferably about 45°. The flat surface 108 includes an upper or leading edge 108a and a lower or trailing edge 108b. The angular orientation of the hinge pin flat surface 108 facilitates snap-fitting securement of the cargo bin lid hinges 56 to the hinge pins 64. More specifically, for snap-fitting assembly of the cargo bin lid 24 to the cargo bin liner 22, the cargo bin lid 24 is oriented at an angle to the raised platform 74 and the hinge arms 60, 62 are positioned such that the first hinge arms 60 are in engagement with the upper or leading edge 108a of the hinge pin's flat portions 108 while the second hinge arms 62 are in engagement with the radially opposite side of the hinge pins 64 (FIG. 6). Thereafter, the cargo bin lid 24 is pushed or forced toward the hinge pins 64 generally parallel to the plane of the flat portions 108 so as to resiliently spread the first and second hinge arms 60, 62 away from each other and thereby insert the hinge pins 64 between the hinge arms 60, 62. The hinge arms 60, 62 snap around the hinge pin 64 (the first hinge arm 60 snapping slightly over the trailing edge 108b of the flat surface 108) so as to essentially return to their original configuration and retain the hinge pin 64 therebetween, while permitting the cargo bin lid 24 to rotate about the hinge pins 64 to move the cargo bin lid 24 between the open and closed positions.

When in the closed position, the lower surface 44 of the cargo bin lid 24 is supported about its periphery by the cargo bin liner 22 and the panel 26. More specifically, the lower surface 44 of the cargo bin lid 24 rests upon the raised platform 74 of the cargo bin liner 22, while the recessed peripheral portion 48 of the cargo bin lid 24 rests upon the engagement surfaces 86 of the outwardly extending wings 76 and the forward-facing recessed portion 32 of the panel 26. The peripheral rim 88 preferably surrounds at least a portion of the cargo bin lid 24 and further serves to properly align the lid 24 in the closed position.

Although the preferred embodiments of the present invention have been described with particularity herein, it is considered apparent that the present invention is capable of numerous modifications and rearrangements of parts and will typically be customized to fit the host vehicle. Accordingly, the present invention is not to be limited to the structure specifically described herein, but rather is only defined by the claims appended hereto.

What is claimed is:

1. A cargo bin assembly, comprising:
    a cargo bin liner comprising a raised platform that defines a pair of spaced apart openings;

a pair of hinge pins, each of said hinge pins traversing one of said pair of spaced apart openings;

a cargo bin lid comprising an upper surface and a lower surface, said lower surface having a pair of spaced apart hinge receiving recesses formed therein; and, a pair of hinges, each of said hinges including a body member, a first hinge arm, and a second hinge arm, said body member being received within said hinge receiving recess and having a lower surface and an upper surface, said upper surface of said body member being generally flush with said cargo bin lid lower surface, said first hinge arm extending from said body member and being generally aligned with said body member, said second hinge arm extending away from said body member so as to be disposed relatively above said body member and said cargo bin lid lower surface.

2. The assembly according to claim 1, wherein each of said hinge pins has a flat surface formed therein to facilitate attachment of said hinge thereto.

3. The assembly according to claim 2, wherein said second hinge arm is curved and wherein said first and second hinge arms cooperate to define an elongated hinge pin receiving receptacle.

4. The assembly according to claim 3, wherein said first and second hinge arms are generally C-shaped in cross section.

5. The assembly according to claim 4, wherein a distal end of said first hinge arm includes a rib that faces toward said second hinge arm and a distal end of said second hinge arm includes a rib that faces toward said first hinge arm.

6. The assembly according to claim 5, wherein said first and second hinge arms are adapted to be resiliently spread apart during insertion of the hinge pin therebetween.

7. The assembly according to claim 6, wherein said cargo bin lid includes a recessed peripheral portion and said hinge receiving recesses are extensions of said recessed peripheral portion.

8. A method for assembly of a cargo bin lid on a cargo bin liner, said cargo bin liner comprising a raised platform that defines a pair of spaced apart openings, each of said openings being traversed by a hinge pin, each of said hinge pins comprising a flat surface that is at an acute angle to the raised platform, said flat surface including an upper, leading edge and a trailing, lower edge, said cargo bin lid having an upper surface and a lower surface, said lower surface having a pair of spaced apart hinges secured thereto, each of said hinges including a body member secured to the cargo bin lid lower surface, a first hinge arm extending relatively away from the body member in alignment with the body member, and a second hinge arm that is curved and extends away from the body member so as to cooperate with the first hinge arm to define a receptacle for the hinge pin, the method comprising the steps of:

positioning the cargo bin lid such that the hinges are adjacent the hinge pins and the cargo bin lid is at an angle to the raised platform that is essentially equal to the angle that the hinge pin flat surface makes with the raised platform;

moving the hinge against the hinge pin such that the first hinge arms are against the leading edge and the second hinge arms are on a radially opposite side of the hinge pins;

pushing the cargo bin lid toward the hinge pins and thereby spreading the first and second hinge arms away from each other to insert the hinge pin therebetween.

9. The method according to as the cargo bin lid is claim 8, wherein, as the cargo bin lid is pushed toward the hinge pins, the first hinge arm snaps over the trailing edge.

\* \* \* \* \*

UNITED STATES PATENT AND TRADEMARK OFFICE
CERTIFICATE OF CORRECTION

PATENT NO.    : 6,742,823 B2
DATED         : June 1, 2004
INVENTOR(S)   : Guanzon et al.

It is certified that error appears in the above-identified patent and that said Letters Patent is hereby corrected as shown below:

Title page,
Item [56], References Cited, U.S. PATENT DOCUMENTS, after "5,979,016 A * 11/1999 Fan….16/266" insert -- 5,992,681 11/1999 Byrd et al --.; after "2002/0070574 A1 * 6/2002 Carlsson et al…..296/37.14" insert -- 2003/0066165 4/2003 Hansen, II et al. --.

Column 6,
Line 31, after "to", delete "as the cargo bin lid is".

Signed and Sealed this

Twenty-eighth Day of September, 2004

JON W. DUDAS
*Director of the United States Patent and Trademark Office*